United States Patent
Crean (10) Patent No.: US 7,226,122 B2
(45) Date of Patent: Jun. 5, 2007

(54) PROCESS FOR INSULATING RECREATIONAL VEHICLES WITH RECYCLED MATERIAL

(75) Inventor: Johnnie R. Crean, Chino, CA (US)

(73) Assignee: Alfa Leisure, Inc., Ontario, CA (US)

( * ) Notice: Subject to any disclaimer, the term of this patent is extended or adjusted under 35 U.S.C. 154(b) by 0 days.

(21) Appl. No.: 11/456,028

(22) Filed: Jul. 6, 2006

(65) Prior Publication Data

US 2007/0007793 A1    Jan. 11, 2007

Related U.S. Application Data

(60) Provisional application No. 60/697,499, filed on Jul. 8, 2005.

(51) Int. Cl.
*B60R 13/08*    (2006.01)
(52) U.S. Cl. .................................. 296/211; 296/181.6
(58) Field of Classification Search ............ 296/24.35, 296/24.41, 39.1, 39.3, 156, 181.1, 181.6, 296/187.02, 211, 214, 901.01
See application file for complete search history.

(56) References Cited

U.S. PATENT DOCUMENTS

| | | | | |
|---|---|---|---|---|
| 1,626,655 A | * | 5/1927 | Woodson | 52/404.1 |
| 2,988,241 A | * | 6/1961 | Morrison | 220/592.26 |
| 3,574,390 A | * | 4/1971 | Metsker | 296/156 |
| 3,766,862 A | * | 10/1973 | Heap et al. | 105/358 |
| 3,815,307 A | * | 6/1974 | Tantlinger | 52/285.1 |
| 3,951,284 A | * | 4/1976 | Fell et al. | 414/812 |
| 4,117,551 A | * | 9/1978 | Brooks et al. | 366/162.1 |
| 4,477,399 A | * | 10/1984 | Tilton | 264/45.2 |
| 5,700,050 A | * | 12/1997 | Gonas | 296/187.05 |
| 5,772,276 A | * | 6/1998 | Fetz et al. | 296/181.6 |
| 5,888,616 A | * | 3/1999 | Ang | 428/141 |
| 6,399,366 B1 | * | 6/2002 | Seagren | 435/290.2 |
| 2005/0082297 A1 | * | 4/2005 | Dhellemmes | 220/562 |

FOREIGN PATENT DOCUMENTS

JP    2002265059 A  *  9/2002    ............ 53/396

* cited by examiner

*Primary Examiner*—D. Glenn Dayoan
*Assistant Examiner*—Paul Chenevert
(74) *Attorney, Agent, or Firm*—Knobbe Martens Olson & Bear, LLP (57) ABSTRACT

Previously used packing and shipping material, including foam based packaging and support products, may be recycled in a manner so as to reduce the manufacturing costs associated with insulating the structural enclosures of recreational vehicles. By finely shredding pieces of recycled packing material, an adaptive insulation material may be produced such that, when introduced into spatial cavities within structural enclosures of recreational vehicles using, for example, forced air, the adaptive insulation material substantially conforms to regular and irregular contoured structures. Utilizing recycled packing materials as insulation provides many advantages which result in an effective and valuable means for reducing production costs, reducing adverse environmental impact, and maintaining insulation efficiency of recreational vehicles.

22 Claims, 7 Drawing Sheets

PROCESS FOR INSULATING RECREATIONAL VEHICLES WITH RECYCLED MATERIAL

CROSS-REFERENCE TO RELATED APPLICATIONS

This application claims the benefit of U.S. Provisional Application 60/697,499 filed Jul. 8, 2005 entitled "PROCESS FOR INSULATING RECREATIONAL VEHICLES WITH RECYCLED MATERIAL" which is incorporated herein in its entirety by reference.

BACKGROUND OF THE INVENTION

1. Field of the Invention

The present invention relates to recreational vehicles and, in particular, relates to a process for insulating recreational vehicles with recycled material.

2. Description of the Related Art

Recreational vehicles (RVs) typically provide users with the comforts and amenities of home while travelling. RVs typically comprise an enclosed living quarters mounted on wheels for mobility, and includes, but is not limited to, a motorhome, a fifth wheel trailer, a trailer, or a tent trailer. Motorhomes are generally self-propelled while travel trailers are towed by a towing vehicle.

One comfort feature provided by RVs includes shielding of the occupants inside the RV from the exterior environment outside the RV. The level of shielding, as well as the comfort and amenities level in general, typically increases with the size of the RV. For example, a small, foldable tent trailer provides minimal thermal insulation, and is intended to be used in mild climates. Larger RVs, such as fifth wheel trailers and motorhomes, have fixed walls and roofs that provide a much greater level of protection from the exterior environment and thus may be used in a greater range of climates. In one aspect, the thermal insulation provided by larger RVs, in conjunction with heating and air conditioning units, provide the occupants with a climate controlled interior living space within the RV that may be substantially different than the exterior climate.

Thermal insulation for RVs is typically provided by positioning insulating materials sandwiched between an outer structural panel member and an inner structural panel member so as to form an insulated structure, such as the wall, roof, and/or floor. One popular insulating material is fiberglass that has a thermal resistance, commonly referred to as an R-value, of approximately 3 for a thickness of approximately 1 inch. Commonly referred to as an R-3 insulation value, the units are implied to be in ft$^{2o}$ F. h/Btu. While the fiberglass may easily conform to the shape of the insulated structures, fiberglass, unfortunately, does not necessarily provide sufficient insulation in areas having relatively thin structures, such as found in many RVs.

Another popular thermal insulator is a foam material that has an R-value of approximately 5 to 6 per inch of thickness, almost twice that of the fiberglass. One method of using the foam as a thermal insulator is to sandwich a pre-formed solid block of foam within the structures. In structures that are generally flat, such as the wall structures, flat blocks of foam may be applied to the flat structures in a cost efficient manner. In structures that include curves or irregular shapes, such as in many roof structures and rounded structural components, the shape of the foam may need to be either molded or shaped in a process that is directly tied to the design of the curved structure. Thus, if the design of the curved structure is modified, the shaping process for the foam also needs to be modified, which increases manufacturing costs associated with most structural products. In some cases, if shaping of the foam for a plurality of small curved structures are found to significantly increase manufacturing costs, then such areas of the RV may not be insulated for cost savings, which, unfortunately, reduces the overall insulating performance of the RV.

Hence, commonly used types of insulation, fiberglass and foam cannot be used easily to insulate some areas of the recreational vehicle. Small enclosed spaces often cannot be adequately insulated, as the sheets of fiberglass or foam are difficult to be positioned within the enclosed space. A further difficulty with commonly used types of insulation is the cost factor. To provide insulation to a small enclosed space, a larger piece of insulation material may have to be cut up to provide the small piece of insulation for the small space. This can result in wastage of the remaining sheet of insulative material which increases the cost of manufacture of the recreational vehicle. Moreover, there is increased labor costs associated with spending the time to shape the fiberglass sheet or the foam sheet to match the enclosed space. Thus, there is a need for an improved way of providing insulation to small, hard to reach spaces in recreational vehicles.

An unrelated expense that occurs during the manufacture of a recreational vehicle is the cost of disposing of extraneous packing material. Recreational vehicles come equipped with appliances and fixtures that are generally provided by outside vendors. Large numbers of packing boxes and materials have to be disposed of by the recreational vehicle manufacturer. These boxes and materials often include cardboard and foam materials that are bulky requiring large trash facilities and have a detrimental environmental effect. These factors also represent a cost to the manufacturer.

SUMMARY OF THE INVENTION

The aforementioned needs may be satisfied by a recreational vehicle comprising a carriage assembly having a plurality of wheels and a plurality of wall enclosures mounted on the carriage assembly, where the wall enclosures define an interior living space having a floor, and where at least one wall enclosure comprises at least one inner spatial cavity. In one embodiment, the recreational vehicle may further comprise an insulation barrier adapted to conform to the at least one inner spatial cavity of the at least one wall enclosure in a manner so as to shield the interior living space from the exterior environment, where the insulation barrier comprises shredded packing material.

The aforementioned needs may also be satisfied by a method of insulating a recreational vehicle having a carriage assembly with a plurality of wheels. In one embodiment, the method may comprise forming a plurality of structural components on the carriage assembly of the vehicle in a manner so as to form spatial cavities within the structural components of the vehicle, where the structural components when assembled define an enclosed living space having a floor. In addition the method may further comprise shredding packing material and filling the spatial cavities with the shredded packing material in a manner such that the shredded packing material adapts to the contour of the spatial cavities and forms an insulation barrier between the interior and the exterior of the vehicle.

In another aspect, the preferred embodiments of the present invention provide a method of insulating a recreational vehicle. The method comprises shredding packing material and blowing the shredded packing material into spatial cavities within the vehicle.

These and other objects and advantages of the present invention will become apparent from the following description taken in conjunction with the accompanying drawings.

DETAILED DESCRIPTION OF THE PREFERRED EMBODIMENT

Figure 1A:
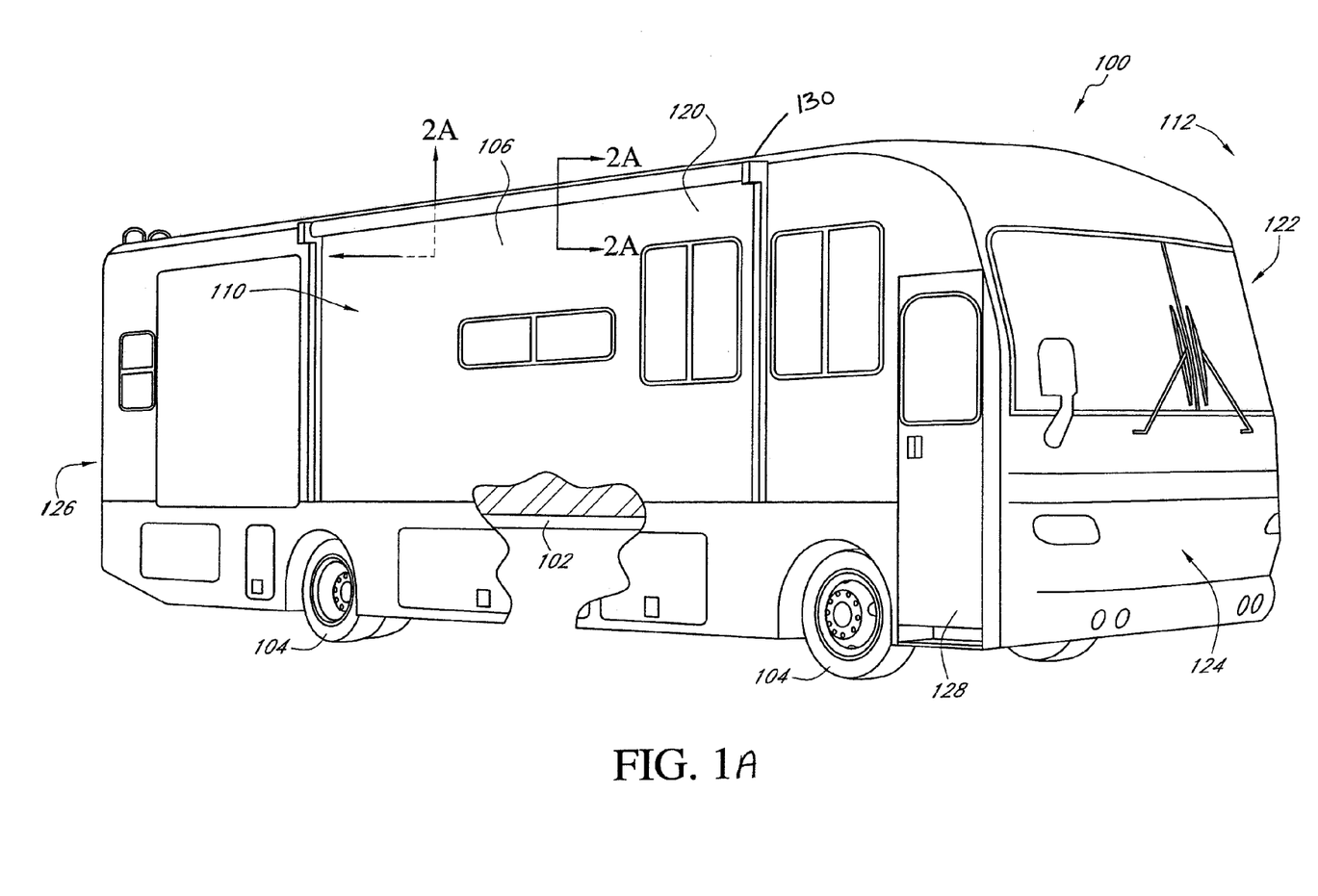
FIG. 1A illustrates one embodiment of a recreational vehicle (RV) comprising a motorhome having a generally rectangular carriage assembly attached to a plurality of wheels so as to permit rolling movement of the RV over the ground.

Reference will now be made to the drawings wherein like numerals refer to like parts throughout. FIG. 1A illustrates one embodiment of a recreational vehicle (RV) 100 comprising a motorhome having a generally rectangular carriage assembly 102 attached to a plurality of wheels 104 so as to permit rolling movement of the RV 100 over the ground. FIG. 1A further illustrates a main housing 106 that may be mounted above the carriage assembly 102. In one aspect, the main housing 106 may comprise a plurality of planar enclosures that may be joined together and mounted to the carriage assembly 102 in a known manner so as to define an interior living space 110. In addition the plurality of planar enclosures may include a plurality of sidewall structures 120, 122, 124, 126, a roof structure 130, and a floor structure 132 (shown in FIG. 1B). It should be appreciated that the plurality of planar enclosures of the RV 100 may be utilized as insulative barriers between the interior living space 110 and an exterior area 112 outside the RV 100. Therefore, in accordance with one embodiment of the present invention, the plurality of planar enclosures of the RV 100 may comprise adaptive insulation in a manner that will be described in greater detail herein below.

In one aspect, one of the plurality of planar enclosures may comprise a first fixed sidewall 120 having a main entry door 128, which provides an RV user with a first point of entry into the RV 100 from the exterior area 112 of the RV 100. Also, a horizontal axis, which may parallel the floor, extends in a first direction from a front portion 140 (FIG. 1B) adjacent a front fixed sidewall 124 of the RV 100 to a rear portion 142 (FIG. 1B) adjacent a rear fixed sidewall 126 of the RV 100. It should be appreciated that the RV 100 described herein represents any movable coach on wheels, such as, but not limited to, the motorhome, a fifth wheel trailer, a trailer, or a tent trailer.

In one embodiment, the RV 100 permits occupants to travel and live inside the illustrated motorhome in a comfortable manner such that the indoor climate in the interior living space 110 may be substantially different from the outdoor climate in the exterior area 112 outside the RV 100. In one aspect, the controlled interior climate may be achieved by a heating and/or air conditioning device, wherein the efficiency of climate control may be greatly enhanced by providing thermal insulation in the sidewall, roof, and floor structures interposed as, for example, a barrier between the interior living space 110 and the exterior environment 112 to the RV 100. Therefore, it should be appreciated that an insulated recreational vehicle may require less energy to heat or cool the interior living spaces, which may reduce energy consumption by the RV 100.

Figure 1B:
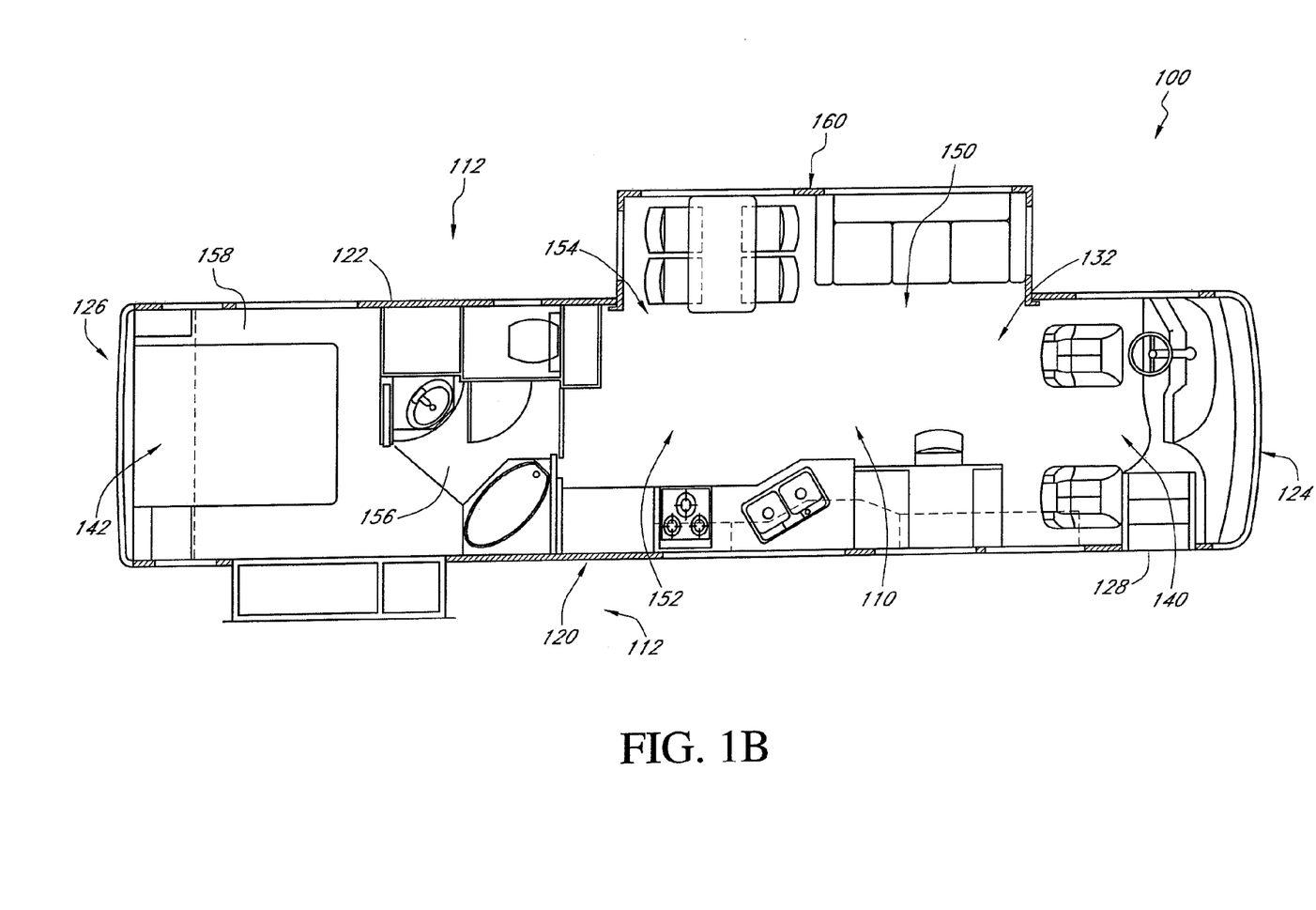
FIG. 1B illustrates one embodiment of a detailed plan view of the interior living space in the RV of FIG. 1A.

Reference will now be made to FIG. 1B, which provides one exemplary embodiment of a detailed plan view of the interior living space 110 within the RV 100 of FIG. 1. In particular, FIG. 1B illustrates the RV 100 of FIG. 1 with the interior living space 110 arranged in a manner so as to provide comfort and functionality to one or more users. In one aspect, the interior living space 110 of the RV 100, as shown in FIG. 1A may be sub-divided into designated living spaces, including a living room area 150, a kitchen area 152, a dining area 154, a bathroom area 156, and a bedroom area 158.

In addition, the RV 100 may be equipped with an expandable slide-out section 160 attached to a second fixed side wall 122 that may be used to increase the interior living space 110 of the RV 100 in a manner as described in the Applicant's co-pending U.S. patent application Ser. No. 09/595,144 entitled "Recreational Vehicles with Expandable Room" (Inventor: Johnnie R. Crean), which is hereby incorporated by reference in its entirety. Moreover, the front portion 140 of the RV 100 may serve as a riding and/or driving area for the driver and passengers when the RV 100 is in a traveling motion. It will be appreciated that the layout of the interior living area 110 as illustrated herein is simply one illustrative embodiment and that a number of variations to this layout may be made by those skilled in the art without departing from the scope of the present invention. Moreover, the illustrated embodiment of the RV 100 shown here comprises a motorhome. It will be appreciated, however, that recreational vehicle is a term not specifically limited to self-propelled motorhomes but can include buses, cab over campers, and trailers such as travel trailers and recreational vehicles and that the insulation method described herein can be applied to any of these recreational vehicles without departing from the spirit of the present invention.

Figure 2A:
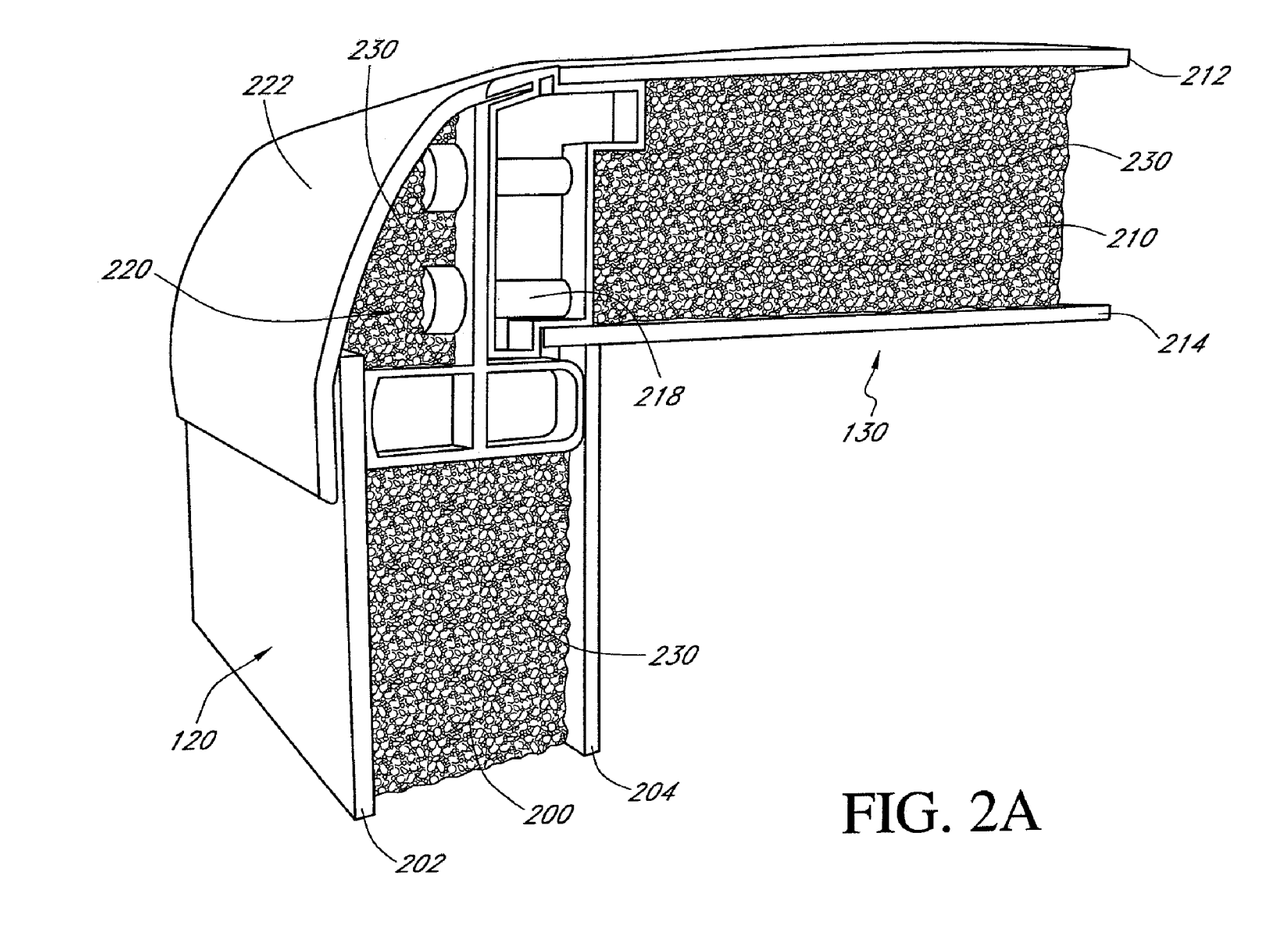
FIG. 2A illustrates a cross-sectional perspective view of the first fixed sidewall and roof structures forming a sidewall panel cavity and a roof panel cavity that may be filled with adaptive insulation.

FIG. 2A illustrates a cross-sectional perspective view of the first fixed sidewall and roof structures or enclosures 120, 130 forming a sidewall panel cavity 200 and a roof panel cavity 210 that may be filled with adaptive insulation 230 in a manner that will be described in greater detail herein below with reference to FIG. 3A. As illustrated in FIG. 2A, the distal ends of the first fixed sidewall and roof structures 120, 130 may be interconnected together in a substantially perpendicular manner using an attaching mechanism 218, wherein a first corner cap structure 222 may be attached to form a seal at the intersection of the first fixed sidewall and the roof structures 120, 130 so as to form a first corner cavity 220. Advantageously, the irregular shape of the first corner cavity 220 may also be filled with the adaptive insulation 230. It should be appreciated that additional disclosure relating to the attaching mechanism 218 is described in the Applicant's co-pending patent application Ser. No. 09/965,463 entitled "Method for Fabricating a Motorhome" (Inventor: Johnnie R. Crean), which is hereby incorporated by reference in its entirety.

In one embodiment, the sidewall cavity 200 of the first fixed sidewall 120 may be configured to comprise adaptive insulation 230 interposed between an outer sidewall layer 202 and an inner sidewall layer 204. The adaptive insulation 230 in the first fixed sidewall 120 may comprise a thickness of approximately 2 inches, which may provide a desirable R-value. It should be appreciated that the R-value of the adaptive insulation 230 may vary depending on the particular application. In one aspect, the adaptive insulation 230 may comprise component parts or pieces of packing and/or shipping material ranging in size and shape. In one aspect, packing and shipping material comprising various sizes and shapes may be finely torn to pieces by a generally known shredding device so as to produce the adaptive insulation material. Preferably, the component parts of the adaptive insulation 230 may be shredded from foam based packaging material, such as polystyrene loosefill elements including foam packing fillers, spacers, and bracers, and cardboard materials, such as boxes and the like.

In general, R-value may be defined as the thickness (L) of an insulation barrier, such as the thickness of the adaptive insulation 230 divided by thermal conductivity (k) of the material in the insulation barrier. Thus, in one embodiment, a good thermal insulator has a relatively higher R-value, and can generally insulate better than a barrier with a relatively low R-value. The R-value of an insulation barrier can be to increases with increasing the thickness (L) of the insulation barrier. Another way is to select a insulative material with a relatively low thermal conductivity (k). Additionally, in one aspect, low weighted material with low thermal conductivity (k) forms a relatively thin barrier so as to yield a relatively high R-value. For example, foam has a relatively high R-value of approximately 5 to 6 for a section that is 1 inch thick. Moreover, the R-value is usually expressed in units of $ft^{2\circ}$ F. h/Btu. For example, an R-value, such as 5, may be expressed simply as R-5, and the above stated units are implied. Furthermore, the R-values are additive when insulating materials are placed in sequence. Thus, for example, a 2 inch thick foam may yield an R-value of approximately 10 to 12.

The adaptive insulation material is preferably obtained from various packing materials that accompany various components of the RV 100 during shipping. For example, appliances to be installed in the RV 100 may be purchased from an outside vendor, and arrive at the RV 100 manufacturing facility in boxes, typically packed using some sort of foam based packing material. Advantageously, the cardboard and foam based packing material may be shredded and used as adaptive insulation material for the RV 100. In addition, recycling the cardboard and foam based packaging material in the manner described herein is beneficial not only from a manufacturing point of view, but also benefits the environment in a manner such that the packing material is not thrown away in a landfill or garbage dump. It should be appreciated that use of other various types of packing materials, including card board boxes and various paper fillers, may be used as insulation for the RV 100 by one skilled in the art without departing from the scope of the present invention.

Furthermore, the shredded packing material may be introduced into the inner spatial cavities of the plurality of planar enclosures using, for example, forced air from an air compressor or various types of fans. In one aspect, the velocity of the forced air may be selected so as to control the packing density of the shredded packing material within the spatial cavities. As illustrated in FIG. 2A, the adaptive insulation 230 may comprise component pieces of shredded packing material, varying in size and shape, that may be tightly packed in the inner spatial cavities of the planar enclosures so as to produce an efficient barrier layer that is capable of shielding the interior 110 of the RV 100 from the external environment 112 outside the RV 100. In one embodiment, the component pieces of shredded packing material may vary in size from small to large, and the shape may comprise regular and/or irregular contours without departing from the scope of the present teachings. Moreover, it should be appreciated that the shredded component pieces in packed form may also comprise voids of air between neighboring component pieces depending on the deformable elasticity of the component pieces and the velocity at which the component pieces were packed.

The outer sidewall layer 202 may comprise a plurality of structural layers, including, for example, a plywood layer attached to a fiberglass layer, wherein the fiberglass layer may be oriented towards the exterior area 112 of the RV 100 so as to provide generally known protection from the exterior environment and adverse weather conditions. The inner sidewall layer 204 may also comprise a plurality of structural layers, including an aluminum frame layer and a decor panel layer, wherein the decor panel layer may be oriented towards the interior living space 110 of the RV 100.

It should be appreciated that the first fixed sidewall 120 may comprise additional layers of material without departing from the scope of the present invention. It should also be appreciated that the second fixed sidewall 122, the front fixed wall 124, and the rear fixed wall 126 may also comprise adaptive insulation 230 interposed between outer and inner sidewall layers 202, 204 in a manner as previously described with reference to the first fixed sidewall 120.

In general, areas of the sidewalls 120, 122, 124, 126 and roof and floor structures 130, 132 that are generally planar and relatively large can be readily equipped with sheets of insulation positioned in between the outer sidewall layer 202 and the inner side wall layer 204. However, the presence of windows, vents, passageways, and conduits results in the creation of smaller less uniformly shaped voids or compartments in the sidewalls 120, 122, 124, 126 and roof and floor structures 130, 132. Adaptive insulation comprising, in one embodiment, shredded packing material can be used to fill these voids or compartments so as to conform to the contour of the irregular shapes.

For example, as illustrated in FIG. 2A, the distal ends of the first fixed sidewall and roof structures 120, 130 may be joined together with the first corner cap structure 222 to thereby form the first corner cavity 220, which defines a void with an irregular shape. Advantageously, the irregular shape of the first corner cavity 220 may be filled with the adaptive insulation 230 so as to provide insulation to the first corner cap structure 222. It should be appreciated that the process of filling the first corner cavity with adaptive insulation 230 will be described in greater detail herein below.

In addition, the roof cavity 210 of the roof structure 130 may be configured to comprise adaptive insulation 230 interposed between an outer roof layer 212 and an inner roof layer 214. As illustrated in FIG. 2A, the outer roof layer 212 may be curved in a manner so as to form a crown towards the center portion of the roof structure 130, and the inner roof layer 214 may comprise a substantially planar orientation as compared to the curvature of the upper roof layer 212. As such, the adaptive insulation 230 may be shaped in a manner so as to conform to the curvature of the roof structure 130 and to the substantially planar inner roof layer 214 in a manner as will be described in greater detail herein below.

As further illustrated in FIG. 2A, the adaptive insulation 230 of the roof cavity 210 may comprise a thickness of at least greater at the center portion of the roof structure 130, adjacent the crown, than the thickness at the distal ends of the roof structure 130, which may be approximately 2 inches. Similar to the adaptive insulation 230 in the sidewall cavity 200, the adaptive insulation 230 in the roof cavity 210 may provide a desirable R-value. It should be appreciated that the R-value of the adaptive insulation 230 may vary depending on the particular application. Additionally, it should be appreciated that the configuration of the roof structure 130, including the curvature of the outer roof layer 212 may be altered by one skilled in the art without departing from the scope of the present invention. Further scope and functionality of the adaptive insulation 230 will be described in greater detail herein below.

Figure 2B:
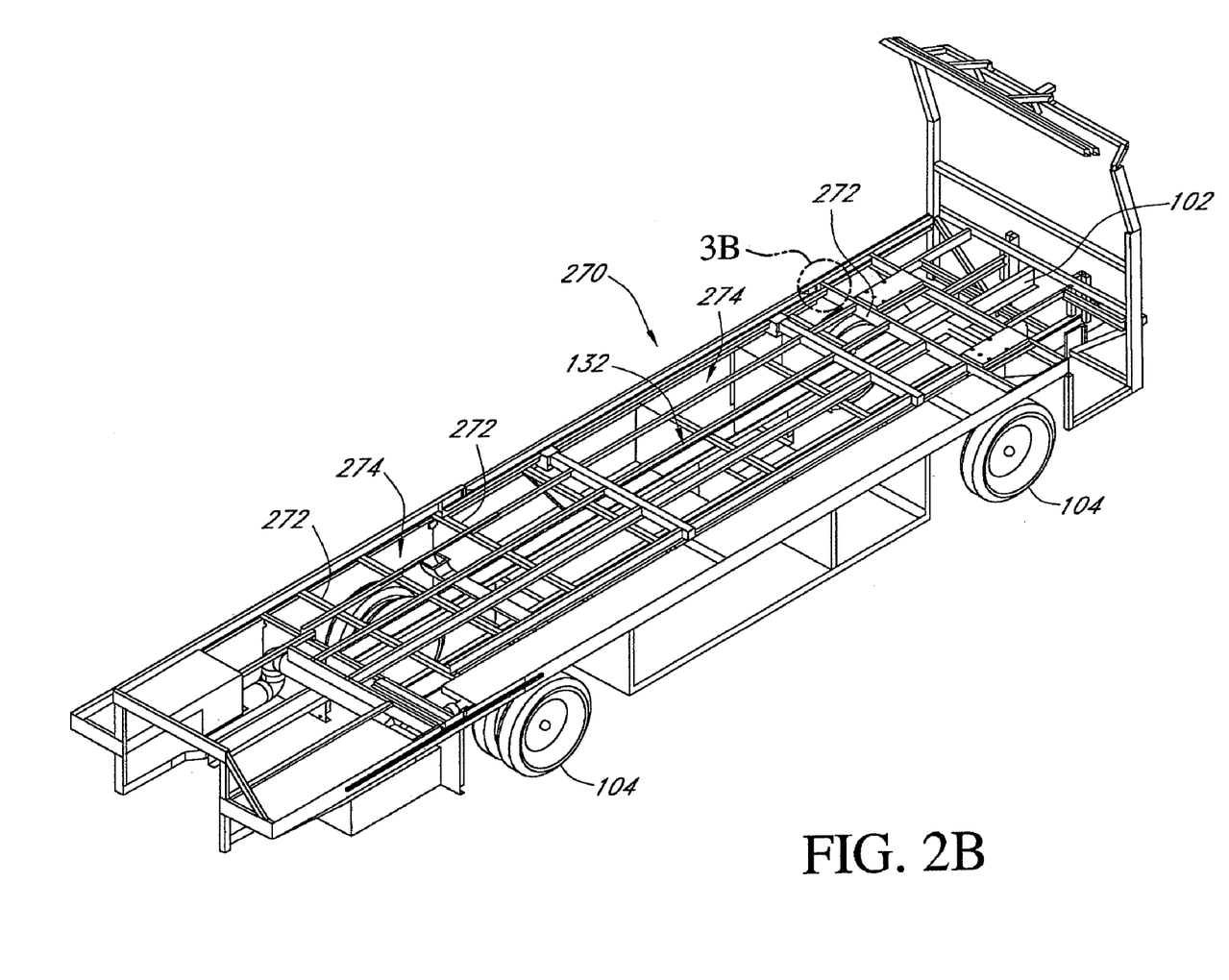
FIG. 2B illustrates one embodiment of the floor frame of the RV in FIG. 1, wherein a vehicle frame may be mounted to the chassis.

FIG. 2B illustrates one embodiment of the floor frame 270 of the RV 100, wherein the floor frame 270 may be mounted to the chassis 102. The floor frame 270 may comprise a plurality of cross support members 272 that may be interconnected in a manner so as to form a substantially planar and horizontal sub-floor 132 having a plurality of sub-floor spatial cavities 274. In one aspect, the adaptive insulation 230 may be formulated with an adhesive slurry material that may be used to coat the sub-floor surfaces including the chassis 102, the floor frame 270, and the cross support members 272 so as to permit build-up of the adaptive insulation/adhesive slurry in and around the sub-floor spatial cavities 274. The scope of this process will be described in greater detail herein below with reference to FIG. 3B.

It should be appreciated that coating the sub-floor surfaces of the RV 100 may be performed during various manufacturing stages in a known manner by those of ordinary skill in the art. It should also be appreciated that additional description relating to the structural framework of the RV 100 is disclosed in the Applicant's co-pending U.S. patent application entitled "Method of Fabricating a Motorhome" (Inventor: Johnnie R. Crean).

Figure 3A:
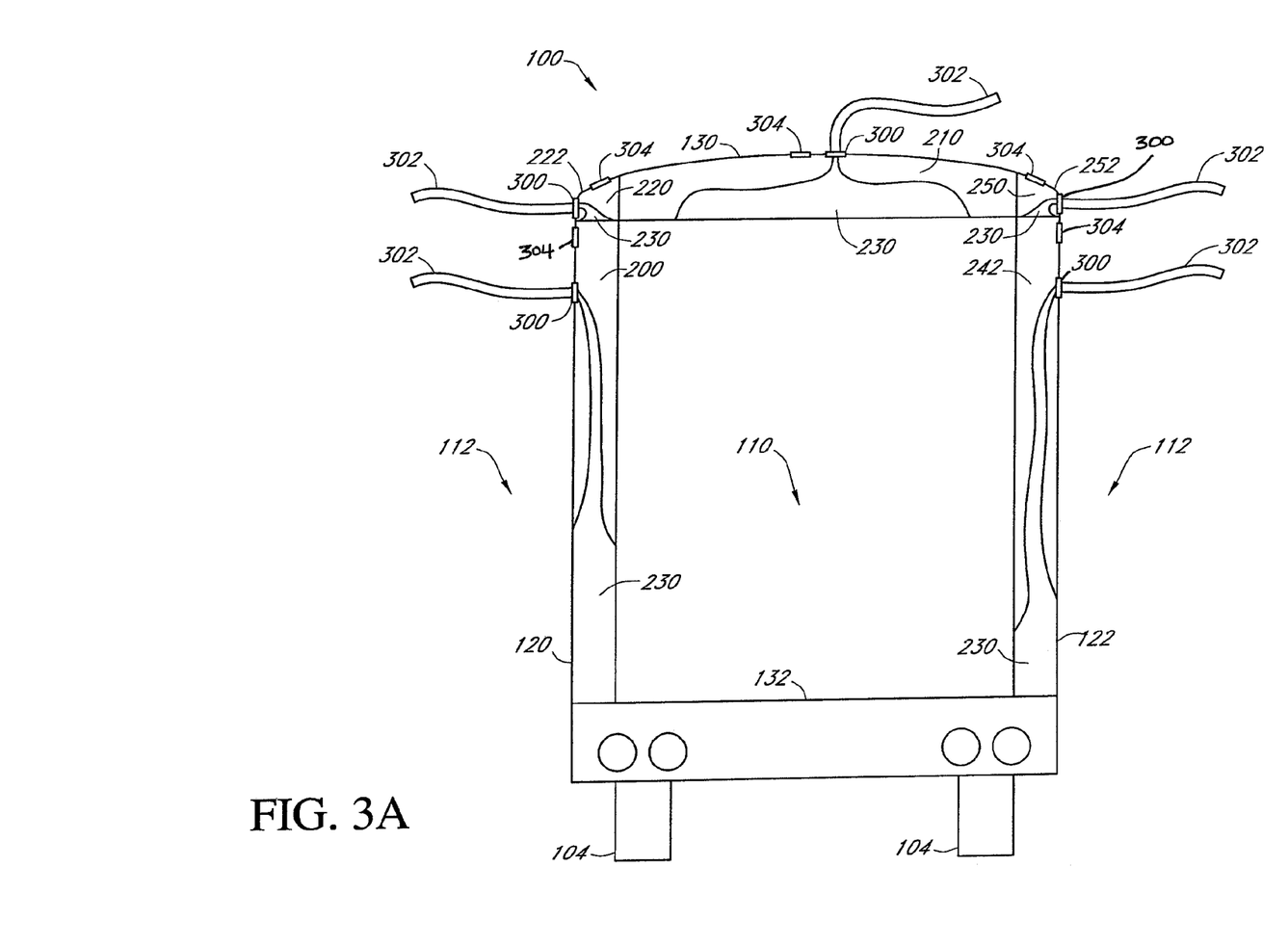
FIG. 3A illustrates one embodiment of filling the sidewall structures, corner cap structures, and the roof structure of the RV with adaptive insulation.

FIG. 3A illustrates one embodiment of filling the sidewall structures 120, 122, corner cap structures 220, 250, and the roof structure 130 of the RV 100 with adaptive insulation 230. In a manner as previously described, the first fixed sidewall structure 120 may comprise a first sidewall cavity 200 and the roof structure 130 may comprise a roof cavity 210. Similarly, the second sidewall structure 122 may comprise a second sidewall cavity 242. Although not shown in FIG. 3A, it should be appreciated that the front sidewall structure 124 may comprise a front sidewall cavity, and the rear sidewall structure may comprise a rear sidewall cavity. In a manner as previously illustrated with reference to FIG. 2A, the distal ends of the first fixed sidewall and roof structures 120, 130 may be joined together with the first corner cap structure 222 to form the first corner cavity 220. Similarly, in a manner as illustrated in FIG. 3A, the distal ends of the second fixed sidewall and roof structures 122, 130 may be joined together with a second corner cap structure 252 to form the second corner cavity 250.

In this particular embodiment, the outer layers of the sidewall structures 120, 122, the corner cap structures 220, 250 and the roof structure 130 may comprise couplers 300 adapted to receive conduits 302 so as to allow the adaptive insulation 230 to be pumped into the spatial cavities 200, 210, 220, 242, 250 via the conduits 302. The couplers 300 may be attached in various locations on the structures 120, 122, 130, 220, 250 without departing from thee scope of the present invention. The outer layers may further comprise a plurality of relief valves 304 that allow passage of displaced air and runoff insulation material as the wall cavity is being filled. It should be appreciated that, once the spatial cavities 200, 210, 220, 242, 250 are filled with adaptive insulation 230, the couplers 300 may be removed and the coupler openings sealed using, for example, a sealing cap and an adhesive sealing component, such as a liquid epoxy or glue.

In one aspect, the adaptive insulation 230 may be pumped into the spatial cavities 200, 210, 220, 242, 250 using, for example, forced air from an air compressor, wherein the amount of component compression may vary depending of the velocity of the forced air. Advantageously, the velocity of the forced air may be used to compact and conform the adaptive insulation material into the voids of the spatial cavities 200, 210, 220, 242, 250 including irregular structural shapes.

Figure 3B:
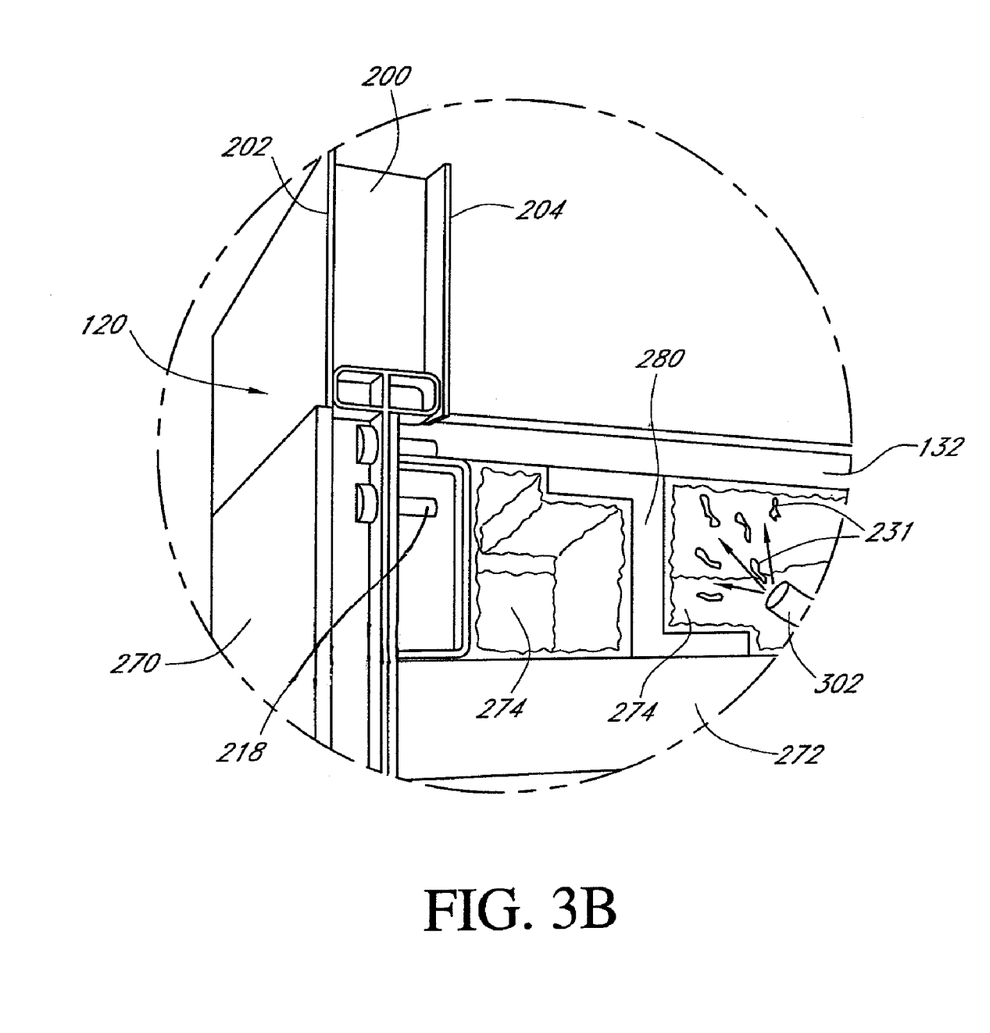
FIG. 3B illustrates one embodiment of filling/coating the sub-floor spatial cavities of the floor frame of the RV with adaptive insulation.

FIG. 3B illustrates one embodiment of filling/coating the sub-floor spatial cavities 274 of the floor frame 270 of the RV 100 with adaptive insulation 230. As previously described with reference to FIG. 2B, the floor frame 270 is mounted to the chassis 102 of the RV 100. As illustrated in FIGS. 2B, 3B, the floor frame 270 may comprise a plurality of cross support members 272 that may be interconnected in a manner so as to form a substantially planar and horizontal sub-floor 132 having a plurality of sub-floor spatial cavities 274 that can be regular or irregular in shape. The sub-floor 132 may also be supported by additional support members 280, such as Z-bars. Also, the sidewall 120 can be attached to the floor frame 270 with the attaching mechanism 218 in a manner as previously described with reference to FIG. 2A.

In one embodiment, sub-floor spatial cavities 274 may be insulated in a manner as follows. The conduit 302 may be positioned proximate to the sub-floor spatial cavities 274 so that adhesive slurry material 231 may be pumped into the cavities 274 using, for example, forced air in a manner as previously described with reference to FIG. 3A. The adhesive slurry material 231 coats the sub-floor surfaces including the chassis 102, the floor frame 270, the cross support members 272, and the additional support members 280 so as to permit build-up of the adhesive slurry material in and around the sub-floor spatial cavities 274. The adhesive slurry material 231 can then cure overtime and solidify so as to provide insulation. The adhesive slurry material 231 may be formed with a combination of the adaptive insulation 230 and a generally known adhesive or binding material, such as glue, resin, or various other binding agents.

Advantageously, coating the sub-floor surfaces with the adhesive slurry material 231 may insulate the floor frame 270 so as to improve the insulation performance of the RV 100. Also, insulating the floor frame 270 may also reduce road noise during travel. It should be appreciated that the adhesive slurry material 231 may also be pumped into the sidewall structures 120, 122, 124, 126, corner cap structures 220, 250, and the roof structure 130 of the RV 100 so as to cure and solidify and provide insulation without departing from the scope of the present invention.

Figure 4:
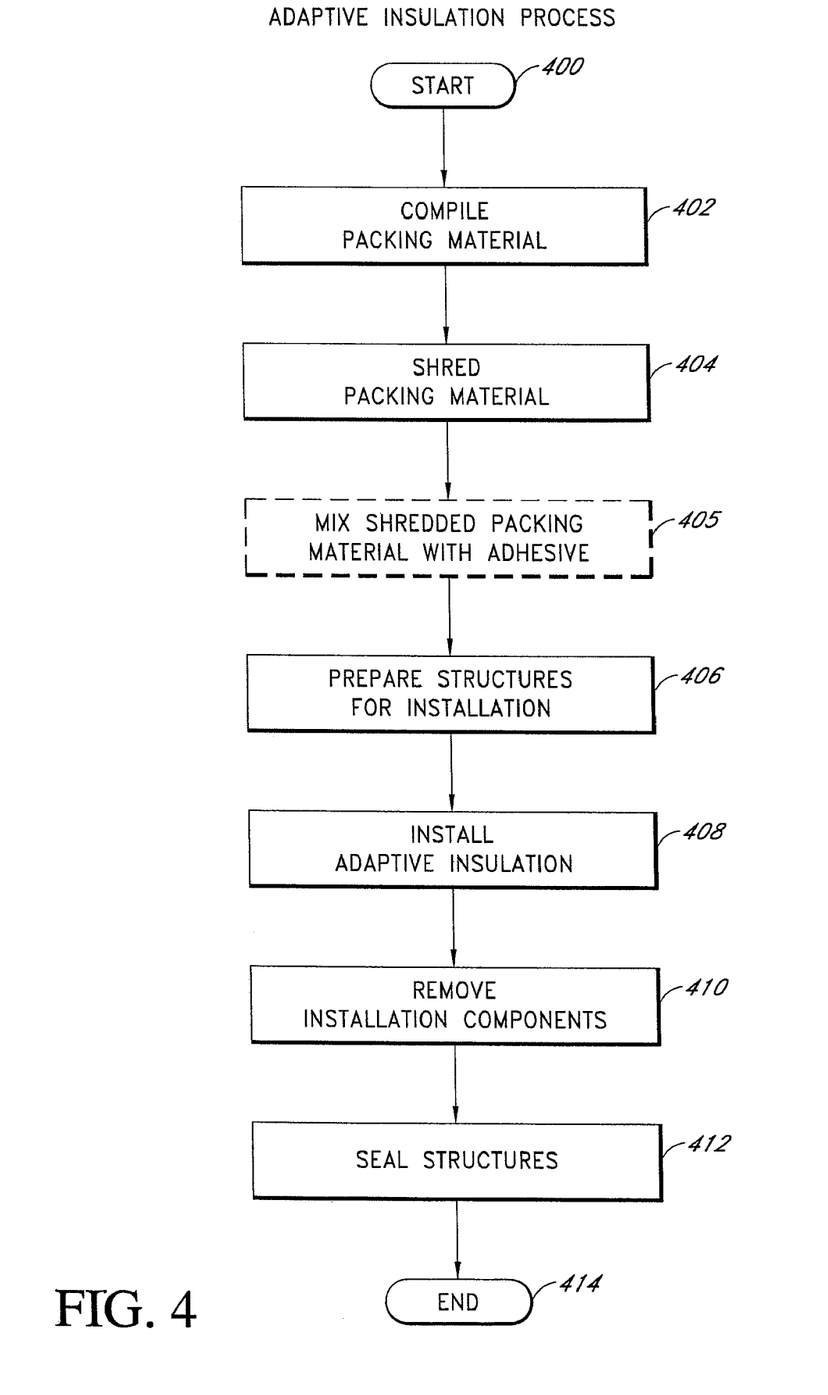
FIG. 4 illustrates one embodiment of an adaptive insulation process, whereby the adaptive insulation may be manufactured and installed in the spatial cavities of the corresponding structures of the RV in FIGS. 1A–1B.

FIG. 4 illustrates one embodiment of an adaptive insulation process, whereby the adaptive insulation 230 may be manufactured and installed into the spatial cavities 200, 210, 220, 242, 250 of the corresponding structures 120, 122, 130, 220, 250 of the RV 100. In one aspect, the adaptive insulation process utilizes previously received packing and shipping materials as insulation material in a manner so as to reduce the manufacturing costs associated with insulating the wall enclosures of the RV 100. In addition, the adaptive insulation process shreds used packing material to produce an adaptive insulation material that may be pumped into spatial cavities between the wall enclosures of the RV 100 using compressed air. The shredded insulation material advantageously conforms to regular and irregular enclosed spatial cavities that may otherwise be costly to insulate using conventionally known insulation methods.

The adaptive insulation process initiates in a start state 400 and then advances to a state 402. In the state 402, packing material is compiled in a manner as previously described and then shredded in a state 404. In the state 404, packing material of various sizes and shapes may be finely torn to pieces by a generally known shredding device so as to produce the adaptive insulation material.

Optionally, in a state 405, a curable slurry comprising an adhesive or binder may be added to the shredded insulation material. In the process, packing material of various sizes and shapes are shredded by a generally known shredder to produce the adaptive insulation. An adhesive or binder is then mixed with the adaptive insulation in a mixer, which results in the adhesive slurry material that can be pumped into an enclosed space or sprayed onto surfaces so as to cure and solidify and provide insulation. As previously described, the packing material can be obtained from various packing materials that are used deliver various components of the RV during manufacturing. For example, appliances to be installed in the RV are typically purchased from a vendor, and arrive at the manufacturing facility in packed boxes. It will be appreciated that recycling of the packing material in the manner as previously described above is advantageous from a manufacturing point of view, but also benefits the environment in a manner that is generally well known.

In a state 406, the fabricated structures 120, 122, 130, 220, 250, 274 of the RV 100 are prepared for installation of the adaptive insulation material or the adhesive slurry material, wherein one or more of the conduits 302 may be attached to the couplers 300 and the relief valve openings 304 may be checked for obstructions. Next, in a state 408, the adaptive insulation material or the adhesive slurry material may be pumped into the spatial cavities 200, 210, 220, 242, 250 of the corresponding structures 120, 122, 130, 220, 250 of the RV 100 in a manner as previously described. In a state 410, the conduits 302 may be removed from the couplers 300. In one aspect, the couplers 300 may also be removed and the coupler openings of the structures 120, 122, 130, 220, 250 sealed in a manner as previously described with reference to FIG. 3A. Following the state 412, the adaptive insulation process terminates in an end state 414.

Beneficially, the compiled packing material may be shredded and introduced into the spatial cavities of the planar enclosures using, for example, forced air from an air compressor or various types of fans. The adaptive insulation 230 may comprise component pieces of shredded packing material, varying in size and shape, that may be tightly packed in the inner spatial cavities of the planar enclosures so as to produce an efficient barrier layer that is capable of shielding the interior 110 of the RV 100 from the external environment 112 outside the RV 100. Also, the adaptive insulation 230 may be mixed with a binding agent to form the adhesive slurry material 231 that may also be pumped into the inner spatial cavities of the planar enclosures, wherein cured adhesive slurry material 231 can also produce an efficient barrier layer. The velocity of the forced air may be selected so as to control the packing density of the shredded packing material within the spatial cavities. Therefore, depending on the contoured shape, overall size, deformable elasticity, and the velocity at which the component pieces were packed, the insulation density of the adaptive insulation in packed form may be selected in a manner so as to provide increased insulation efficiency for the RV 100.

Advantageously, previously used packing and shipping material, including foam based packaging and support products, may be recycled in a manner so as to reduce the manufacturing costs associated with insulating the planar enclosures of recreational vehicles. By finely shredding pieces of used packing material, an adaptive insulation material may be produced such that, when introduced into spatial cavities of the structural enclosures of recreational vehicles using, for example, compressed and/or forced air, the adaptive insulation material substantially conforms to regular and irregular contoured shapes. Beneficially, the adaptive and conforming insulation fills in the regular and irregular spatial cavities of structural enclosures that may otherwise be expensive to conventionally insulate. In addition, implementing the above-mentioned adaptive insulation process provides a useful mechanism for recycling packing materials such that the utilization of adaptive insulation results in an effective and valuable means for reducing production costs, reducing adverse environmental impact, and maintaining insulation efficiency of recreational vehicles.

Although the following description exemplifies one embodiment of the present invention, it should be understood that various omissions, substitutions, and changes in the form of the detail of the apparatus, system, and/or method as illustrated as well as the uses thereof, may be made by those skilled in the art, without departing from the scope of the present invention. Therefore, the scope of the present invention should not be limited to the disclosed embodiments, but should be defined by the appended claims.

What is claimed is:

1. A recreational vehicle comprising:
    a carriage assembly having a plurality of wheels;
    a plurality of wall enclosures mounted on the carriage assembly, wherein the wall enclosures define an interior living space having a floor, and wherein at least one wall enclosure comprises at least one inner spatial cavity; and
    an insulation barrier adapted to conform to the at least one inner spatial cavity of the at least one wall enclosure in a manner so as to shield the interior living space from the exterior environment, wherein the insulation barrier comprises shredded packing material.

2. The vehicle of claim 1, wherein each wall enclosure comprises an inner structural layer and an outer structural layer and mounted together on the carriage assembly so as to form the at least one inner spatial cavity of each wall enclosure.

3. The vehicle of claim 1, wherein at least one of the wall enclosures comprises a roof enclosure having an outer roofing layer and an inner ceiling layer mounted together so as to form at least one inner spatial roof cavity.

4. The vehicle of claim 3, wherein the distal ends of the roof enclosure and the wall enclosures are attached so as to define a main living enclosure, and wherein a plurality of corner caps are attached to the main living enclosure where the distal ends of the roof enclosure and the exterior enclosures intersect.

5. The vehicle of claim 4, wherein a plurality of inner spatial corner cavities are formed when the corner caps are attached to the main living enclosure, and wherein the inner spatial corner cavities comprise the insulation barrier.

6. The vehicle of claim 1, wherein the shredded packing material comprises at least one of cardboard, paper fillers, and foam based material.

7. The vehicle of claim 1, wherein the shredded packing material comprises component pieces of shredded packing material compressed together to form the insulation barrier.

8. The vehicle of claim 1, wherein each wall enclosure further comprises at least one coupler such that at least one conduit may be attached to the at least one coupler.

9. The vehicle of claim 8, wherein the shredded packing material is pumped into the at least one inner spatial cavity of each wall enclosure via the at least one coupler and conduit using forced air.

10. The vehicle of claim 1, wherein the shredded insulation material is mixed with an adhesive or binding agent to form an adhesive slurry material.

11. The vehicle of claim 10, wherein the adhesive slurry material is used to coat the carriage assembly in a manner so as to create a lower insulation barrier between the vehicle and the road.

12. The vehicle of claim 10, wherein the insulation barrier comprises the adhesive slurry material, which is adapted to conform to the at least one inner spatial cavity of each wall enclosure.

13. A method of insulating a recreational vehicle having a carriage assembly with a plurality of wheels, the method comprising:
    forming a plurality of structural components on the carriage assembly of the vehicle in a manner so as to form spatial cavities within the structural components of the vehicle, wherein the structural components when assembled define an enclosed living space having a floor;
    shredding packing material; and
    filling the spatial cavities with the shredded packing material in a manner such that the shredded packing material adapts to the contour of the spatial cavities and forms an insulation barrier between the interior and the exterior of the vehicle.

14. The method of claim 13, wherein the shredded packing material comprises at least one of cardboard, paper fillers, and foam based material.

15. The method of claim 13, wherein the shredded packing material is pumped into at least one spatial cavity using forced air.

16. The method of claim 13, wherein the shredded packing material is mixed with an adhesive or binding agent to form an adhesive slurry material.

17. The vehicle of claim 16, wherein the adhesive slurry material is used to coat the carriage assembly in a manner so as to create a lower insulation barrier between the vehicle and the road.

18. A method of insulating a recreational vehicle, comprising:
    shredding packing material; and
    blowing the shredded packing material into spatial cavities within the vehicle.

19. The method of claim 18, wherein the recreational vehicle comprises a carriage assembly having a plurality of wheels and a plurality of wall enclosures mounted on the carriage assembly and wherein the wall enclosures define an interior space and wherein at least one wall enclosure possesses at least one inner spatial cavity adapted to receive the shredded packing material.

20. The method of claim 18, wherein the shredded packing material comprises at least one of cardboard, paper filler, and foam based material.

21. The method of claim 18, wherein the shredded packing material is produced from recycled packing material.

22. The method of claim 18, wherein the shredded packing material is compressed to form an insulation barrier which substantially conforms to the contour of the at least one spatial cavity.

* * * * *